(12) United States Patent
Fitch et al.

(10) Patent No.: US 6,212,392 B1
(45) Date of Patent: Apr. 3, 2001

(54) METHOD FOR DETERMINING IF THE LOCATION OF A WIRELESS COMMUNICATION DEVICE IS WITHIN A SPECIFIED AREA

(75) Inventors: James A. Fitch, Edmonds, WA (US); Garrick T. Wager, Arvada, CO (US)

(73) Assignee: Signal Soft Corp., Boulder, CO (US)

( * ) Notice: Subject to any disclaimer, the term of this patent is extended or adjusted under 35 U.S.C. 154(b) by 0 days.

(21) Appl. No.: 09/258,228

(22) Filed: Feb. 26, 1999

(51) Int. Cl.[7] ..................................... H04Q 7/56
(52) U.S. Cl. .................. 455/456; 455/457; 340/988
(58) Field of Search .................. 455/456, 457; 342/357.01, 357.09, 451; 701/207, 208, 213; 340/988, 991, 993, 995

(56) References Cited

U.S. PATENT DOCUMENTS

| | | | |
|---|---|---|---|
| 5,030,117 | * 7/1991 | Delorme | 434/130 |
| 5,272,638 | * 12/1993 | Martin et al. | 455/456 |
| 5,717,406 | * 2/1998 | Sanderford et al. | 342/457 |
| 5,736,959 | * 4/1998 | Patterson et al. | 342/354 |
| 5,736,962 | * 4/1998 | Tendler | 342/357.1 |
| 6,011,973 | * 1/2000 | Valentine et al. | 455/456 |

* cited by examiner

*Primary Examiner*—Lee Nguyen
(74) *Attorney, Agent, or Firm*—Marsh Fischmann Breyfogle

(57) ABSTRACT

The present invention is directed to a method for determining whether a location associated with a wireless station, such as a cellular telephone, is located within an area of interest. The area of interest is defined using quadtree representation of an area that includes the area of interest and identifying nodes within the quadtree that represent the area of interest. By iterative comparison of the location associated with the wireless station to the locations associated with a node at each level of the quadtree, a determination can be made as to whether or not the location associated with the wireless station is within the area of interest.

14 Claims, 7 Drawing Sheets

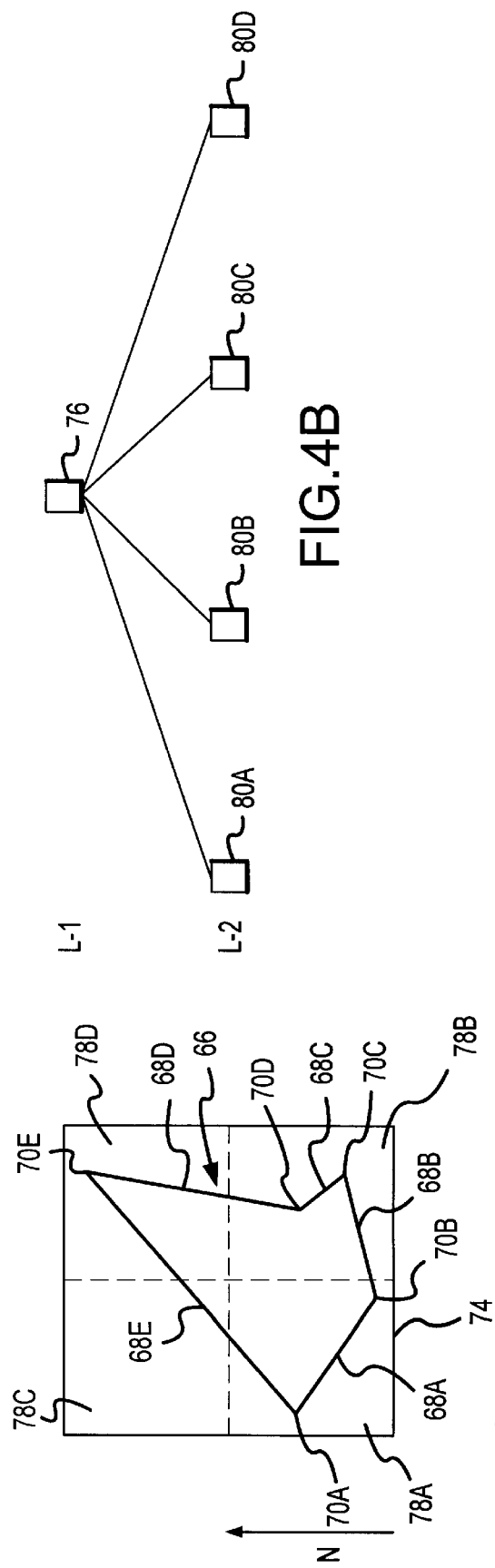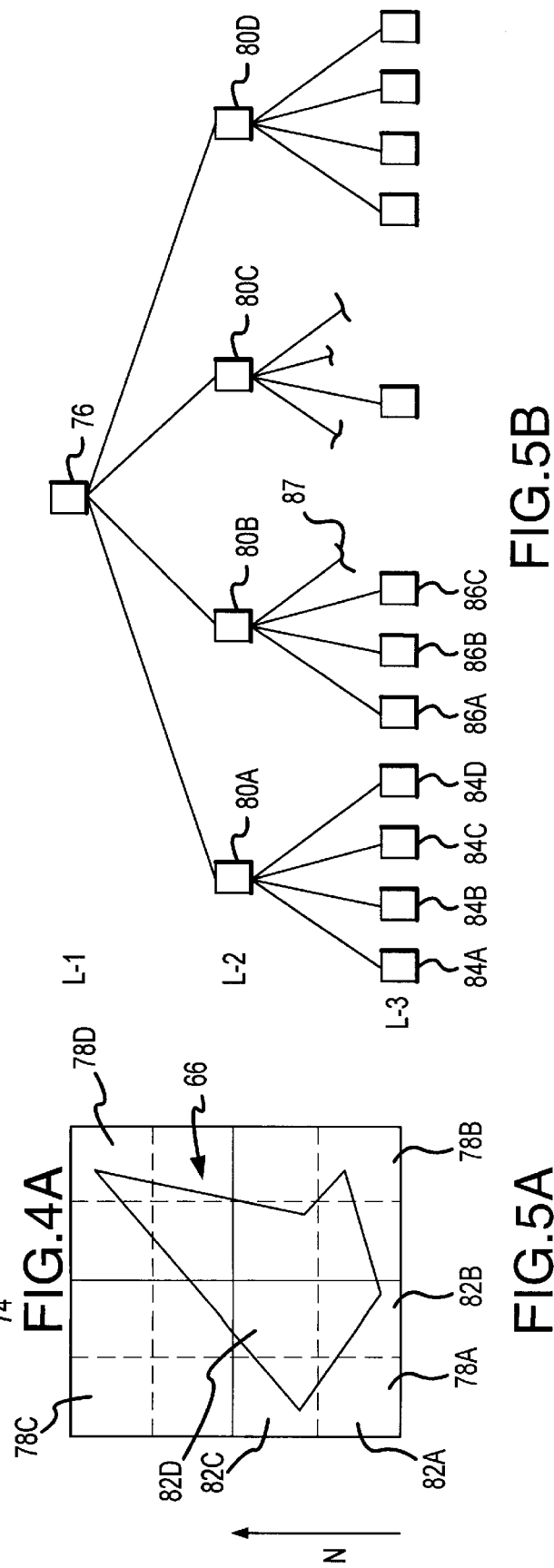

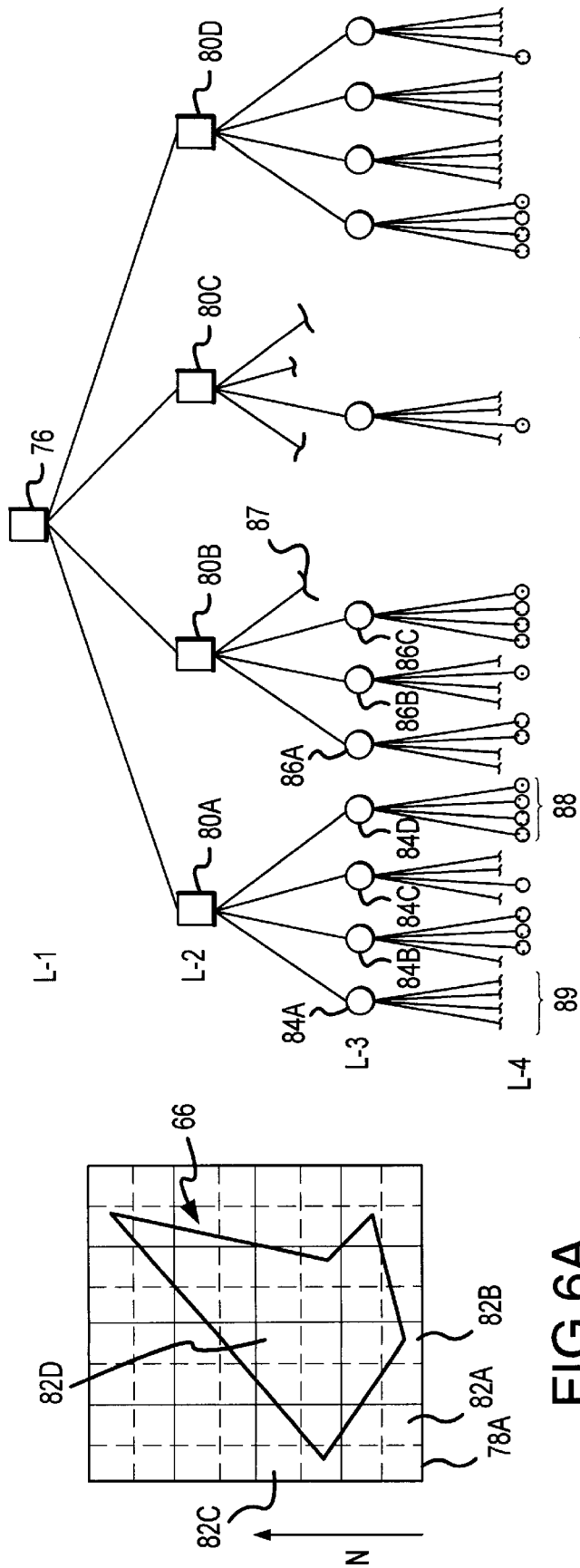

METHOD FOR DETERMINING IF THE LOCATION OF A WIRELESS COMMUNICATION DEVICE IS WITHIN A SPECIFIED AREA

FIELD OF THE INVENTION

The present invention is related to wireless telecommunication systems and, in particular, to the determination of whether the location of a wireless telecommunication device is within a specified area.

BACKGROUND OF THE INVENTION

Wireless telecommunication systems facilitate radio communications between a wireless station, e.g., a cellular telephone (analog, digital and PCS), and other communication devices. Typical of wireless telecommunication systems is a cellular telephone system that facilitates calls to and from cellular telephones within a predetermined service area. The service area of a cellular telephone system is normally subdivided into areas known as "cells." Associated with each cell is a base station antenna that facilitates radio communications with cellular telephones within the cell. The base station antennas of all the cells in a service area are in communication with a mobile switching center ("MSC") that establishes a communication channel between the cellular telephone located in the service area and another telecommunication device. In operation, the MSC establishes a communication channel between a cellular telephone located in the service area and another telecommunication device (e.g., another person's cellular telephone or a land-line telephone). Once the channel is established, communications are relayed between the cellular telephone, the base station, the MSC and the other telecommunication device.

An important characteristic of many wireless stations is mobility. In the case of cellular telephones, a subscriber to a cellular telephone system can conduct calls in the service area and, in many cases, in areas outside of the subscriber's service area. This mobility has lead to the development or proposed development of tools for determining the location of a wireless station. For instance, when a cellular telephone is used to place a "911" emergency call, determining the location of the cellular telephone would be highly desirable so that emergency personnel can assess how best to reach the individual in distress. This is especially important in situations involving remote locations where precise locational information cannot be given or the individual cannot provide locational information due to an injury.

A number of devices have been developed for providing locational information of wireless stations. For example, in cellular telephone systems, the communication protocol used within the system identifies the cell in which a cellular telephone is located when the call connection is established. In many applications, this may provide sufficient locational information. However, because the area covered by a cell can be large, especially in rural settings, more accurate devices have also been developed. For instance, various devices have been developed that use information provided by two or more antennas to provide locational information by triangulation.

SUMMARY OF THE INVENTION

The present invention is directed to determining whether the location associated with a wireless station is within a predetermined area of interest. Such a determination is of considerable value in many situations. For example, such information would be valuable in "911" emergency service situations in mountainous areas where it is commonplace to have one rescue squad be responsible for rescues on one side of a mountain range and another rescue squad be responsible for rescues on the other side of the range. By being able to determine the area (side of the mountain range) within which a call for help is being placed via the "911" service, the present invention facilitates the dispatch of the rescue squad best positioned to respond to the emergency.

To determine whether the location associated with a wireless station is within a predetermined area of interest, the invention uses a "quadtree" computer data structure that represents the area of interest. The quadtree representation of the area of interest facilitates iteratively and quickly determining the area in which the location associated with the wireless station is situated. Once this area (known as a quadrant) has been determined, the quadtree structure further provides an indication of whether or not the quadrant is part of the area of interest. The quadtree data structure can also be updated to reflect changes in the area of interest or to add new areas of interest with little impact upon the telecommunication system in which the invention is implemented.

The quadtree is a multi-level structure with each level representing the same surface area of the earth but higher levels representing the surface area with a higher degree of resolution. In one embodiment, the first level of the quadtree represents the entire surface of the earth and is conceptualized as a "square". The second level of the quadtree represents the four quadrants of the earth's surface, where the first quadrant extends from 0° to 180° longitude and from 0° to 90° latitude; the second quadrant extends from 0° to 180° longitude and from 0° to −90° latitude; the third quadrant extends from 0° to −180° longitude and from 0° to 90° latitude, and the four quadrant extends from 0° to 180° longitude and from 0° to −90° latitude. The second level of the quadtree can be conceptualized as four smaller "squares". These four smaller squares are the four quadrants of the "square" associated with the first level. It should be noted that the portions of the earth's surface that are represented by these four smaller squares are not actually squares due to the curvature of the earths surface. As such, the term "square" is used to aid in visualizing the quadtree. The third level of the quadtree represents sixteen "squares", four groups of four "squares". Each group of four "squares" represents all of the quadrants of one of the squares represented by the second level of the quadtree. So, for example, if one of the "squares" associated with the second level of the quadtree represented the portion of the earth's surface that includes North America, each of the group of four "squares" at the third level that comprise the "square" at the second level would represent one of the quadrants of North America.

It should be appreciated that the area of the earth's surface represented by a "square" at a level decreases as the level increases. For example, the area of the earth's surface represented by a "square" at the third level of the quadtree is considerably less than the area of the earth's surface represented by one of the "squares" at the second level of the quadtree. A quadtree representation of the earth's surface that includes 32 levels provides accuracy to within one centimeter.

The quadtree structure is adapted to identify one or more areas of interest by associating with each square at the highest level, i.e., the smallest squares, a flag or other indication that the square is part of the area of interest. For example, if the quadtree representation of earth's surface has been extended to 10 levels and the area of interest is Los Angeles, a certain number of the squares at level 10 will be identified or "flagged" as representing Los Angeles.

In one embodiment, the portions of the quadtree structure that have been "flagged" (i.e., belong to the area of interest) are reviewed to determine if the quadtree structure can be condensed. This review involves assessing whether each "square" of a group of four "squares" that represent a larger "square" of a preceding level of the quadree is associated with the area of interest. If each of these "squares" is associated with the area of interest, the "flag" can be moved to the larger "square" and the smaller "squares" can be deleted from the quadtree. For instance, if all four "squares" of a group of four "squares" at level-10 are "flagged" as being associated with Los Angeles, it is sufficient to associate the "flag" with the level-9 "square" that encompasses the four level-10 squares. If the "flag" is moved to a lower level square, the amount of memory required to store the quadtree is reduced. Further, a quicker determination of whether the location associated with the wireless station is within the area of interest is possible in certain situations. To continue with the same example, if the location associated with the wireless station is in area represented by the level-9 "square" to which the "flag" has been moved from the four level-10 "squares", the determination will be made sooner because the flag associated with the level-9 "square" will be detected sooner than a flag associated with a level-10 "square".

Also associated with each "square" is a location, which is typically expressed in terms of latitude and longitude. The location is normally the center of the square. Advantageously, by using a quadtree that represents the entire surface of the earth, the location associated with each of the "squares" of the quadtree does not have to be stored. Rather, it can be quickly calculated. To elaborate, the center of the level-1 "square" that is representative of the earth's surface is at 0° longitude and 0° latitude. Further, the longitude of the level-1 "square" extends from −180° to −180°, and the latitude from −90° to −90°. The longitude of the centers of the level-2 "squares" can be determined using a lookup table and the direction of the square from the location associated with the level-1 square. For instance, with respect to the level-2 square that is northwest of the location of the level-1 square, the lookup table would indicate that the longitude value for a level-2 square is 90° and the "west" portion of the direction would mean that the longitude of the northwest square is −90°. Similarly, the latitude value obtained from the lookup table would be 45° and "north" portion of the direction would mean that the latitude is +45°. This concept is extended to higher levels of the quadtree by simply adding the result of the lookup table query and sign designation to the appropriate coordinate of the lower level square. For instance, with respect to the level-3 square that is northeast of the location (−90° long., +45° lat.) of the level-2 square, the lookup table would indicate that a latitude value of 22.5° is appropriate and the "north" portion of the direction would dictate that a latitude of +22.5° should be added to the latitude associated with the level-2 square to produce a latitude of 67.5°.

With a quadtree structure constructed according to the foregoing, the present invention provides the ability to determine whether the location associated with a wireless station is within an area of interest. This determination is accomplished by initially comparing the location associated with the wireless station to the location associated with the square of the first level. Based on this comparison, the quadrant of the first level square in which the location associated with the wireless station is found can be determined. For example, if the location associated with the wireless station is in Los Angeles and the square represented by the first level covered the entire earth, the comparison would show that the location of the wireless station was in the northwest quadrant of the square. This determination is subsequently used to point to the smaller square represented at the second level quadtree that will be subject to the same comparison and to calculate the location associated with this smaller square. To continue with the example, the determination at the first level would point to the second level square that contained Los Angeles, i.e., the northwest quadrant of the earth. At this point, the location associated with this second level square is calculated and compared with the location associated with the wireless station to determine which one of the quadrants of the northwest quadrant contains the location associated with the wireless station. This process continues until a square is reached that indicates that location is either in an area of interest or it is not. If a "flag" is associated with this square, then the location associated with the wireless station is within the area of interest. The absence of a "flag" and any pointers to squares at a higher level indicates that the location of the wireless station is not in an area of interest.

The present invention also provides the ability to build a quadtree data structure suitable for use in determining whether a location associated with a wireless station is within an area of interest. The process is typically initiated by a customer of a wireless service provider giving the service provider a map that identifies one or more areas of interest. For instance, the municipality responsible for responding to "911" calls may station emergency response teams at various locations and make each of these teams responsible for a particular area of the city. Once the area or areas of interest have been identified, a computer map is generated that defines the boundary of each area as a series of lines connected to one another to form a polygon. At this point, a determination is made as to whether the quadrants that form the square represented by the first level of the quadtree are at least partially contained within the polygon. This is done by determining if at least one boundary line of the polygon intersects an edge of the quadrant. For each quadrant with an edge that is intersected by a boundary line, the process is repeated at the second level of the quadtree. This process continues until all the squares represented by the highest level of the quadtree (i.e., the smallest squares) that have an edge that is intersected by a boundary line of the polygon have been identified. At this point, a decision has to be made whether the squares that are not wholly within the polygon are to be identified ("flagged") as being associated with the area of interest. One basis for making this decision is to include the square if the center of the square is within the polygon and otherwise to exclude the square. Other bases for making this decision are, however, feasible. At this juncture all of the squares represented at the highest level that are going to be associated with an area of interest have been identified and the quadtree can be used in a system for determining if the location associated with a wireless station is within an area of interest.

In certain instances the quadtree can be condensed, as previously discussed. Namely, if all of the squares of a group of four squares that constitute the quadrants of a square at the next highest level are "flagged", the square at the next highest level can be flagged and the four squares deleted from the quadtree. The condensation process begins at the highest level of the quadtree and sequentially proceeds through lower levels. The condensation process terminates when a level does not have four squares that satisfy the noted condition. A quadtree that has been condensed has lower storage requirements relative to a quadtree that has not been condensed. Further, a condensed quadtree will increase, in certain situations, the speed at which the determination is made of whether the location associated with the wireless station is within the area of interest.

Also provided by the present invention is the ability to update a quadtree data structure used in making the above-noted determination with little effect upon the telecommunication system in which quadtree structure is implemented. Updating involves assessing the consequences of the proposed changes to the areas of interest. For example, the reduction in size of an area of interest is likely to require that the "flags" associated with one or more of the squares represented at a level of the quadtree be deleted. Once this assessment has been made, a replacement for the portion of the quadtree data structure that requires changes is constructed and inserted into the quadtree data structure. After the replacement has been inserted, the old portion of the quadtree data structure is deleted. Advantageously, since the replacement portion is inserted before the portion being replaced is deleted, the ability to make a determination of whether a location associated with a wireless station is in an area of interest is substantially unaffected. Furthermore, the insertion and deletion process can be accomplished in a very quickly so as not to disturb the telecommunication system that is implementing the process.

The foregoing method for determining if a location is within an area of interest is preferably carried out on a computer system. The computer system includes: (1) a memory that contains (a) a program that performs the operations necessary to determine if the location associated with a wireless station is within a predetermined area and (b) at least a portion of the quadtree data structure described above; (2) a processor that executes the program and, in so doing, accesses the quadtree data structure stored in memory; and (3) an input/output structure for receiving the locational data associated with the wireless station and transmitting an indication of whether or not the location associated with the wireless station is within an area of interest. In one embodiment, the computer system also includes a disk drive for storing all or a portion of the quadtree data structure. This permits portions of the quadtree data structure to be brought into memory as needed by the processor in an operation that is typically referred to as "caching." Consequently, the caching ability permits implementation on a computer system in which a limited amount of memory can be dedicated to the quadtree data structure.

BRIEF DESCRIPTION OF THE DRAWINGS

FIGS. 4A and 4B respectively show a quartered area that includes an area of interest and a graphic of the second level quadtree data structure representative of the area of interest;

FIGS. 5A and 5B respectively show the area after further quartering and a graphic of the three level quadtree data structure representative of the area of interest;

FIGS. 6A and 6B respectively show the area after further quartering and a graphic of the four level quadtree data structure representative of the area of interest;

FIG. 7 shows the area of FIG. 6A with the quadrants that approximate the area of interest shaded;

DETAILED DESCRIPTION

The present invention is directed to the determination of whether a location associated with a wireless station is within a particular area of interest. The noted determination is of particular use with respect to cellular telephones (e.g., analog, digital and PCS). While the invention will be described with respect to a cellular telephone, it should be understood that the invention can be used to make the noted determination with any type of wireless station, provided a location can be associated with the wireless station.

Figure 1:
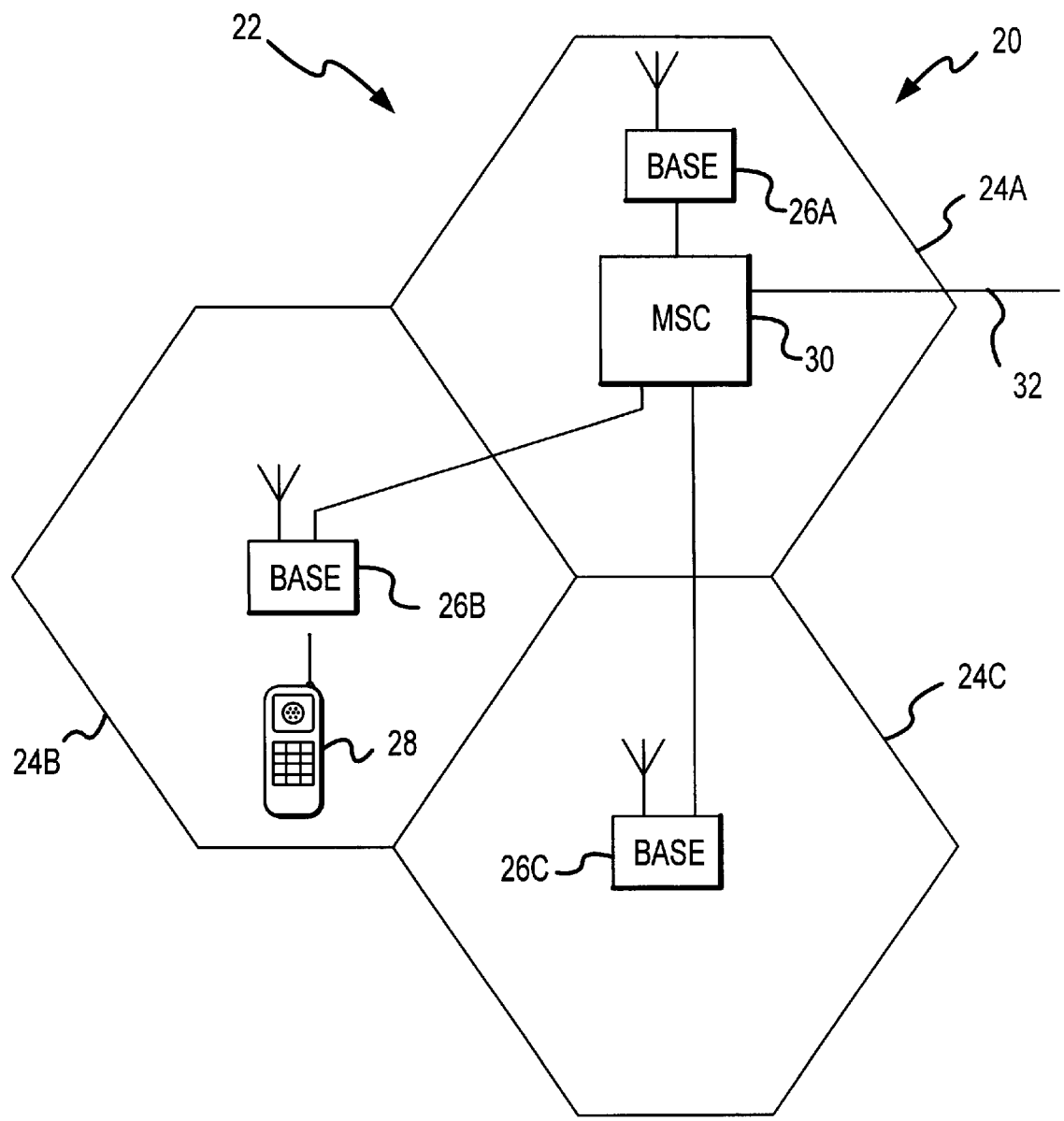
FIG. 1 illustrates the basic components of a cellular telephone system.

With reference to FIG. 1, the basic components of a cellular telephone system 20 are illustrated. The cellular telephone system 20 operates to establish telephone connections for cellular telephones within an service area 22. The service area 22 is subdivided into cells 24A–24C that respectively include base stations 26A–26C for relaying communications to and from cellular telephones 28 located in the cell. Each of the base stations 26A–26C are in communication with a mobile switching center ("MSC") 30 that operates to establish a connection between a cellular telephone in the service area 22 and another telephone device. If the other telephone device is not another cellular telephone in the service area 22, the MSC 30 communicates via an external communication path 32 with the appropriate switching stations to establish the connection. For instance, if the other telephone device is a conventional land line telephone, the MSC 30 uses the external communication path 32 to communicate with the switch that services the land line telephone to establish the communication channel. In operation, the base station associated with the cellular telephone 28 that is attempting to place a call or to receive a call and the MSC 30 cooperate to establish a communication channel between the cellular telephone and the other telephone device. Once the communication channel is established, communications can occur between the cellular telephone and the other telephone device for as long as the cellular telephone remains in the service area 22 or, in the case of roaming service, another service area.

Figure 2:
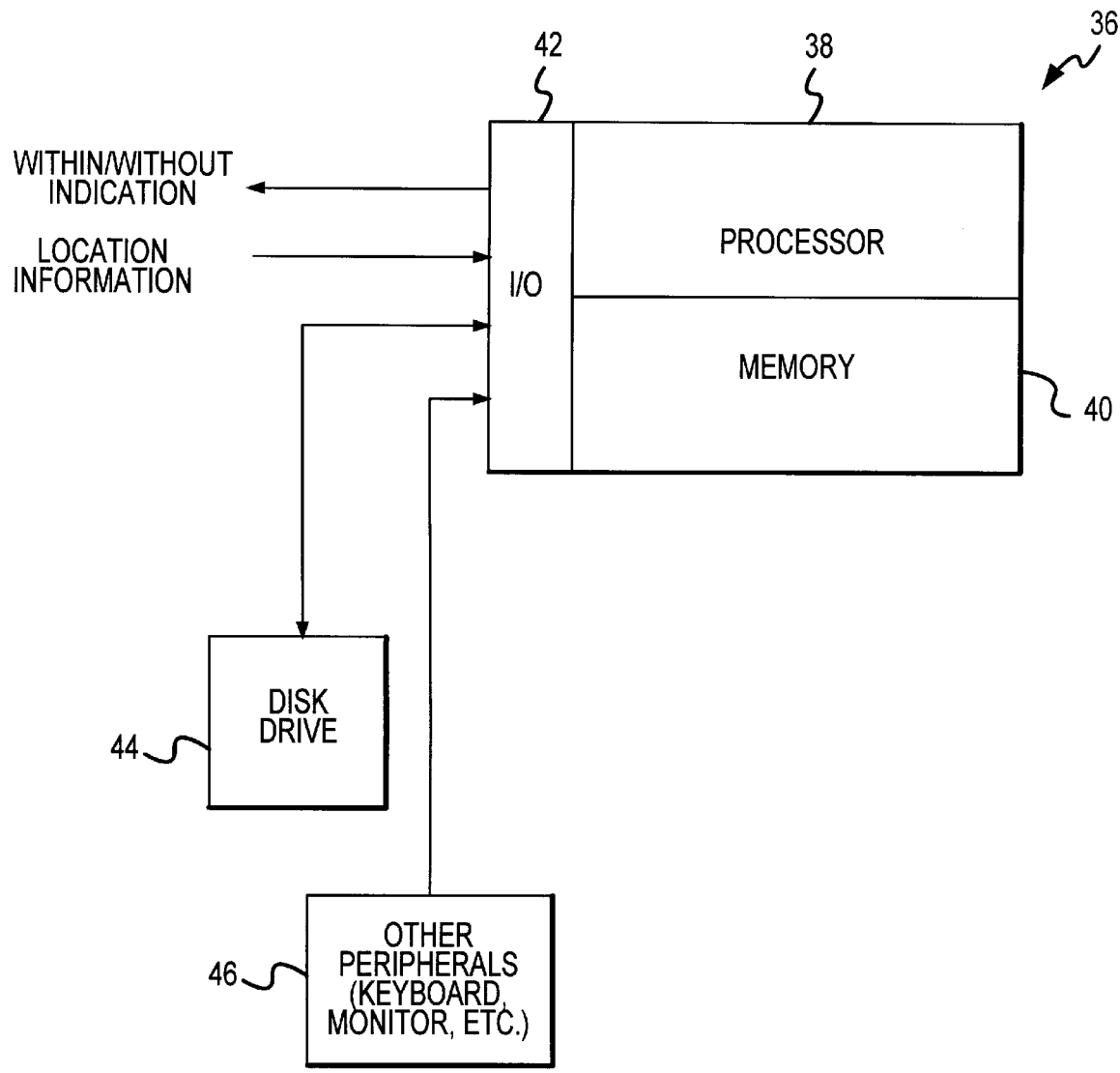
FIG. 2 illustrates the computing structure used to determine whether a location associated with a cellular telephone is within an area of interest.

With reference to FIG. 2, the determination of whether the location associated with cellular telephone is within an area of interest is implemented on a computer system that includes a processor 38, memory 40 and input/output port 42. The processor 38 executes a program that makes use of a quadtree data structure to determine whether a location associated with a cellular telephone is within a predetermined area of interest. During this determination at least a portion of the program and at least a portion of the quadtree data structure are located in the memory 40. The location associated with the cellular telephone is provided to the input side of the port 42. The determination of whether the location is associated with the cellular telephone is within a particular area of interest is provided to the output portion of the port 42. A disk drive 44 is an optional element of the system 36 that can be used to store a portion of the program executed by the processor 38 and load the portion of the program into memory 40 when needed. All or a portion of the quadtree data structure can also be stored on the disk drive 44 and loaded into memory when needed in an operation known as caching. Caching permits portions of the quadtree data structure to be loaded into memory when needed rather than having to retain the entire quadtree data structure in the memory 40. This is particularly useful if there are constraints on the use of the memory 40. For instance, the size of the memory may be limited. The computer system 36 also optionally includes other peripherals, such as keyboards and monitors, that may be useful in executing and/or monitoring the program.

The computer system 36 also executes a program that facilitate the building of the quadtree data structure for one or more areas of interest and modifying an established quadtree data structure to change the boundary of an area of interest, add an area of interest or delete an area of interest. However, it should be appreciated that the building/modifying of a quadtree data structure can occur on another computer system and the resulting quadtree data structure subsequently loaded into the memory 40 and/or the disk drive 44.

Figure 3:
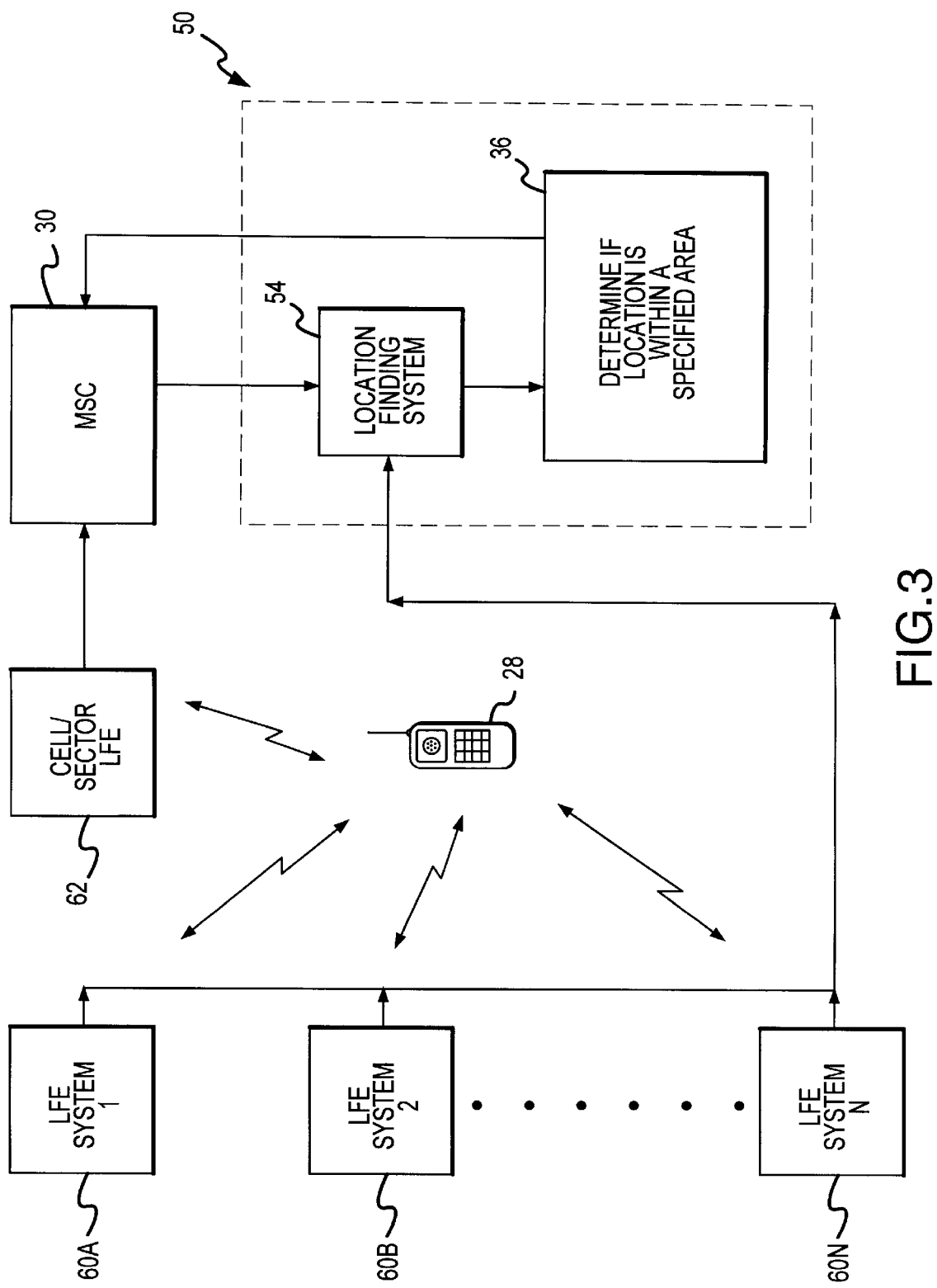
FIG. 3 is a block diagram of the components of a cellular telephone system that are used in determining whether a location associated with a cellular telephone is within a particular area of interest.

With reference to FIG. 3, one possible implementation of the computer system 36 for determining whether a location associated with a cellular telephone is within an area of interest is illustrated. The computer system 36 is resident in a signaling control point intelligent network platform 50. The platform 50 is activated by the MSC 30 upon detecting a number that is recognized as requiring the determination of whether a location associated with the cellular telephone is within an area of interest. For example, the receipt of a "911" cellular call may require the determination of which area of a number of areas encompasses the location associated with the cellular telephone that placed the call so that the appropriate emergency response team can be dispatched.

The computer system 36 receives the location associated with the cellular telephone from a location finding system 54. The location finding system 54 is preferably located on the platform 50 and receives location information relating to the cellular telephone 28 from one or more sources. When receiving location information from a single source, the location finding system 54 passes the location information on to the system 36 if the location information is in the appropriate format. If the location information is not in the correct format, the location finding system 54 reformats the location information into a format suitable for processing by the system 36 before passing the information onto the system 36. Typically, the location information is in terms of latitude and longitude. However, the system 36 can be used with whatever coordinate system is appropriate for the situation. In receiving location information from a number of sources, the location finding system 54 normally combines the locational information provided by each of the sources to produce location information that is subject to less uncertainty than the locational information provided by any one of the sources. The location finding system 54 is also capable of receiving location information directly from a source and/or indirectly from a source, i.e., via a path where there are one or more elements are between the source of location information and the location finding system 54.

With reference to FIG. 3, a number of direct sources 60A–60N for directly providing location information to the location finding system 54 are shown. Among the present types of direct sources are angle of arrival sources ("AOA"), time difference of arrival ("TDOA") and global positioning system ("GPS"). The AOA and TDOA sources use antennas that are typically located within the service area 22 of the cellular telephone system. In many instances, these antennas are at the same location as the base station antennas. The GPS sources are normally integrated into the cellular telephones and rely on satellite signals to determine the location of the cellular telephone 28. The location information determined with a GPS source, while shown as being directly provided to the location finding system 54, can also be provided indirectly via the MSC 30.

An indirect source of location information associated with the cellular telephone 28 is a cell/sector source 62 that is normally associated with a base station and provides location information in terms of the cell and the sector within the cell within which the cellular telephone is located. The cell/sector source is typically integrated within a base station 26A–26C and, as such, provides the cell/sector location information to the MSC 30, which relays the cell/sector location information on to the location finding system 54.

In general, the computer system 36 is provided with cellular telephone location information and, based on the information, provides an indication of whether the location associated with a cellular telephone is within one or more areas of interest. This indication, in the embodiment shown in FIG. 3, is provided to the MSC 30. In turn, the MSC 30 uses this information to determine the appropriate call destination. To continue with the "911" example, the indication that the location associated with the cellular telephone is within a particular area of interest is provided to the MSC 30 and subsequently used to place a call to the appropriate emergency rescue squad. Alternatively, the system 36 uses the indication that the location is in an area of interest as an index to a look-up table or similar structure that contains the appropriate telephone number. In the example, this would be the telephone number for the rescue squad responsible for the area that encompasses the location. The telephone number is then provided to the MSC 30, which subsequently establishes the connection.

Before discussing the construction of a quadtree data structure that is representative of a particular area, a general quadtree data structure that is representative of the earth's surface is discussed first. The quadtree data structure that represents a particular area of interest is a subset of such a quadtree. The general quadtree data structure is characterized by:

(1) a multi-level structure with each level comprised of one or more nodes;

(2) where each node represents a portion of the surface area of the earth (generally, these portions are quadrilaterals that are of a squarer shape near the equator and closer to isosceles triangles near the poles);

(3) where each of the nodes at a level of the quadtree represent a surface area of the earth that is unique (i.e., not overlapping) relative to the surface areas of the earth represented by each of the other nodes at the same level;

(4) the surface area of the earth represented by all of the nodes at one level is the same surface area of the earth represented by all the nodes at every other level of the quadtree; and (5) each level of a quadtree is populated by a number of nodes that equal to four to the nth power, where n is level of the quadtree minus 1;

(6) the size of the surface area of the earth represented by a node decreases with increasing level numbers.

As an example of the foregoing, the first or root level of a general quadtree data structure has a single node (4 to the (1-1)th power is 1) that is representative of the entire surface area of the earth. The second level of the general quadtree is comprised of four nodes (4 to the (2-1) power is 4) that are representative of four quadrants of the earth's surface and that collectively represent the same area, i.e., the entire earth's surface, that is represented by the single node of the first level. These four smaller squares are sometimes referred to as the southwest (SW), southeast (SE), northwest (NW) and northeast (NE) quadrants. Likewise, the third level of the general quadtree is comprised of sixteen nodes (4 to the (3-1) power is 16) that represent sixteen even smaller quadrants that collectively represent the same area as the single node of the first level and the four nodes of the second level.

The creation of the quadtree data structure that is representative of a particular area and capable of being used in determining whether the location associated with a cellular telephone is within a particular area of interest is now discussed with respect to FIGS. 4A–8B. As previously mentioned the quadtree data structure that is representative of an area of interest is a subset of the general quadtree that represents the entire earth's surface. The construction of a quadtree that is representative of a particular area of interest is an iterative process that involves a determination of whether the area of the earth's surface represented by a node is at least partly within the area of interest. This determination proceeds in order from the first or root level to the highest level of the quadtree data structure. The single node at the root level represents the entire surface area of the earth and, as such, necessarily encompasses the area of interest. FIGS. 4A and 4B illustrate the building of the second level of the quadtree data structure for an area of interest; FIGS. 5A and 5B show the third level; and FIGS. 6A and 6B demonstrate the building of the fourth and final level.

With reference to FIGS. 4A and 4B, the creation of a quadtree data structure that is representative of an area of interest begins with the vectorization of the area of interest, i.e., the boundary of the area of interest is approximated by a polygon 66 that is comprised of a plurality of straight sides 68A–68E that can each be described by a vector that extends from a vertex 70A–70E created by the intersection of two of the sides in a specified direction for a specified distance. While vectorization of the area of interest can be accomplished in a number of ways, one way that it is accomplished is by digitizing a paper map of the area of interest using a digitizer that is one of the peripherals 46 of the computer system 36 or a part of a separate computer system. In any event, the vector data is input to a computer system that is running a program for building a quadtree data structure that is representative of any area of interest. This computer system can be the system 36 or a separate computer system.

The depth or maximum number of levels that are to comprise the quadtree must also be determined at the outset and provided to the computer system that is executing the program for building the quadtree data structure that is representative of the area of interest. The depth of the quadtree is a measure of the granularity of the quadtree. Stated differently, the area of the earth's surface that is represented by a node and will be used to approximate the area of interest decrease as the depth of the quadtree increases. Consequently, the greater the depth of the quadtree, the better the approximation of the polygon 66. However, the depth of the quadtree also impacts the amount of memory that is required to store the quadtree data structure. Consequently, in many instances, the depth of the quadtree involves competing considerations. In the example set forth in FIGS. 4A–8B, the depth or maximum number of levels for the quadtree is four levels.

Once the area of interest has been vectorized and the depth of the quadtree determined, the program that is building the quadtree in effect overlays the polygon 66 with a large square area 74 that preferably encompasses the entire polygon 66. Corresponding to the large square area 74 in the quadtree data structure is a level 1 or root node 76. The large square 74 is sub-divided into four smaller squares or quadrants 78A–78D. Any one of the four quadrants 78A–78D that is considered to be part of the polygon 66 will be represented in the quadtree data structure by a second level node. The test to determine whether a quadrant is considered part of the polygon 66 is whether a side of the polygon intersects an edge of the quadrant. With respect to the example set forth in FIG. 4A, at least one side of the polygon 66 intersects at least one edge of each of the four quadrants 78A–78D. Consequently, the four second level nodes 80A–80D that correspond to the four quadrants 78A–78D are added to the quadtree representative of the polygon 66.

With reference to FIGS. 5A and 5B, the process discussed with respect to FIGS. 4A and 4B is repeated with respect to the sub-quadrants that comprise each of the quadrants 78A–78D. With respect to quadrant 78A, all four its sub-quadrants include at least a portion of a side of the polygon 66. Consequently, four, third level nodes 84A–84D are added to the quadtree structure representative of the polygon 66. The same is also true for quadrant 78D. However, only three of the sub-quadrants that comprise the quadrant 78B include a portion of one of the sides of the polygon 66. As such, three, third level nodes 86A–86C are added to the quadtree representative of the polygon 66. A fourth, third level node 87 is also added to the quadtree but marked to indicate that it is not a node that is related to the polygon 66. Similarly, because one of the sub-quadrants of quadrant 78C includes a portion of a side of the polygon 66, a single, third level node is added to the quadtree that is representative of the polygon 66. The other three sub-quadrants of the quadrant 78C do not include a portion of a side of the polygon 66. Consequently, three, third level nodes are added to the quadtree but marked to indicate that they are not related to the polygon 66.

With reference to FIGS. 6A and 6B, the process is again repeated. However, in this case, the quadrants that are being investigated for inclusion in the quadtree representative of the polygon 66 will be represented by fourth level nodes in the quadtree, which is the maximum level or depth for the quadtree in this example. In this situation, the test to determine whether a quadrant is considered part of the polygon 66 is a two part test. The first part of the test is, as with the lower levels, a determination of whether a side of the polygon 66 intersects an edge of the quadrant. If the intersection test is satisfied, the second test is applied. The second test determines whether the center point of the quadrant is within the polygon 66. If the center point of a quadrant is within the polygon 66, a node representative of the quadrant is added to the quadtree representation of the polygon 66. If not, then a node is added but marked as not being part of the quadtree representation of the polygon 66. Under this test, none of the sub-quadrants of quadrant 82A qualify for addition to the quadtree. However, three of the sub-quadrants of quadrant 82B, one of the sub-quadrants of quadrant 82C and all four of the sub-quadrants of quadrant 82D satisfy the test. As such, corresponding nodes to each of the qualifying sub-quadrants are added to the quadtree representative of the polygon 66. The test is repeated with respect to all of the other relevant sub-quadrants to produce the quadtree structure illustrated in FIG. 6B. FIG. 7 shows all of the sub-quadrants that form an approximation of the polygon 66. Of note with respect to the condensation/optimization of the quadtree discussed hereinafter is the group of four, fourth- level nodes 88 that are representative of the four sub-quadrants of quadrant 82D that satisfied the test and the four, fourth level nodes 89 that are not representative of the polygon 66.

At this point, the quadtree structure shown in FIG. 6B is a complete approximation, for the given depth, of the polygon 66 and capable of being used in determining whether the location associated with a cellular telephone or other wireless station is within the approximation of the area of interest that is modeled by the quadtree. However, the quadtree shown in FIG. 6B can be condensed/optimized to reduce the size of the quadtree and in certain situations, speed the determination of whether a location associated with a cellular telephone is within the approximation of the area of interest. Reducing the size of the quadtree serves to reduce the amount of memory needed to store the quadtree, which is an important consideration in certain situations. Speeding the determination is of value in many telecommunication systems due to various time constraints imposed on such systems. Optimization of the quadtree begins by determining if there is a group of four nodes at the deepest level of the quadtree that are: (1) the sub-nodes of a single node at the next highest level; and (2) identified as being associated with the area of interest or not associated with the area of interest. If this test is satisfied, then the nodes at the highest level can be deleted and an indication added to the single node at the next highest level that this node is either associated with the area of interest or not associated with the area of interest. This test is repeated at consecutively higher levels until a level is reached that does not satisfy the criteria.

Figure 8A:
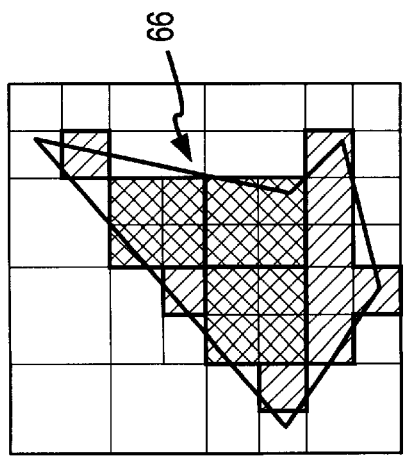
FIGS. 8A and 8B respectively illustrates the area of FIG. 7 after optimization and a graphic of an optimized four level quadtree data structure representative of the area of interest.
Figure 8B:
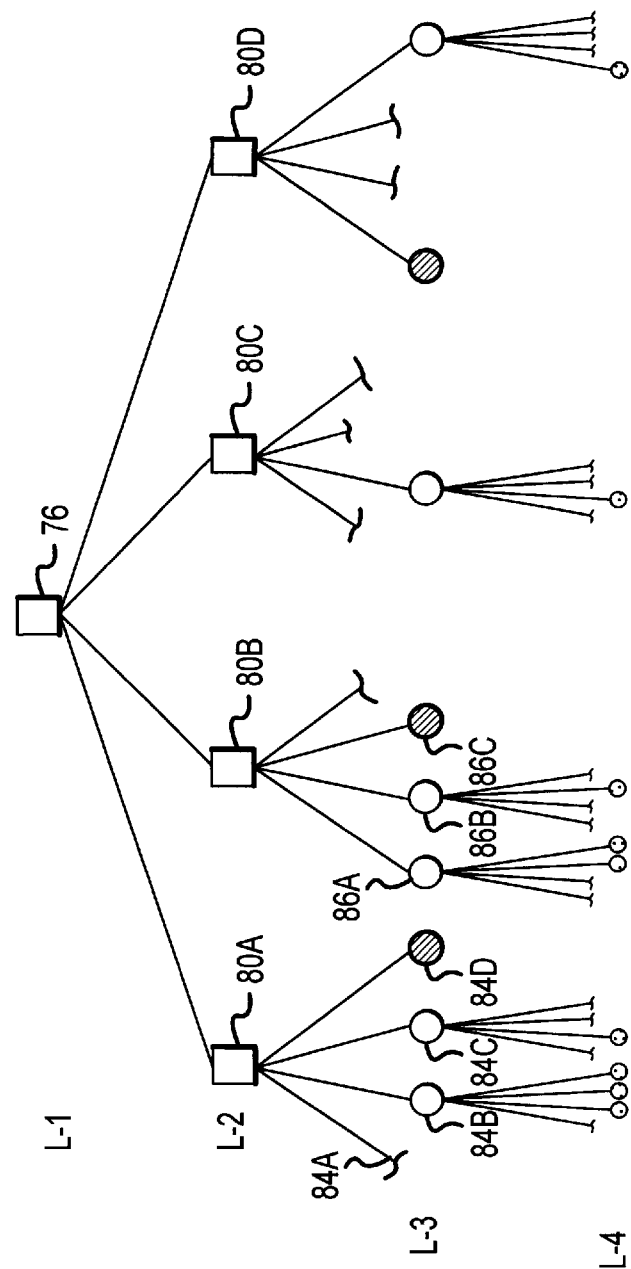

With reference to FIG. 6B, the group of four, fourth level nodes 88 are all sub-nodes of the third level node 84D and are all associated with the polygon 66. As such, the group of four, fourth level nodes 88 is removed from the quadtree and the third level node 84D is identified as being part of the approximation of the polygon 66. The third level node 86C and a sub-node of second level node 80D also meet the noted optimization criteria with respect to nodes that are associated with the polygon 66. With respect to groups of nodes that are not associated with the polygon 66, the group of four, fourth level nodes 89 satisfies the test. Consequently, the group of nodes 89 can be deleted from the quadtree and the third level node 84A can be identified as not being part of the quadtree that is representative of the polygon 66. The test is also satisfied with respect to two groups of four sub-nodes of node 80D. Since there is not a group of four nodes at the third level that satisfy the test, the quadtree shown in FIG. 8B is a completely condensed/optimized quadtree. FIG. 8A shows the quadrants that approximate the polygon 66 and correspond to the third and fourth level nodes of the condensed/optimized quadtree that are representative thereof.

Figure 9:
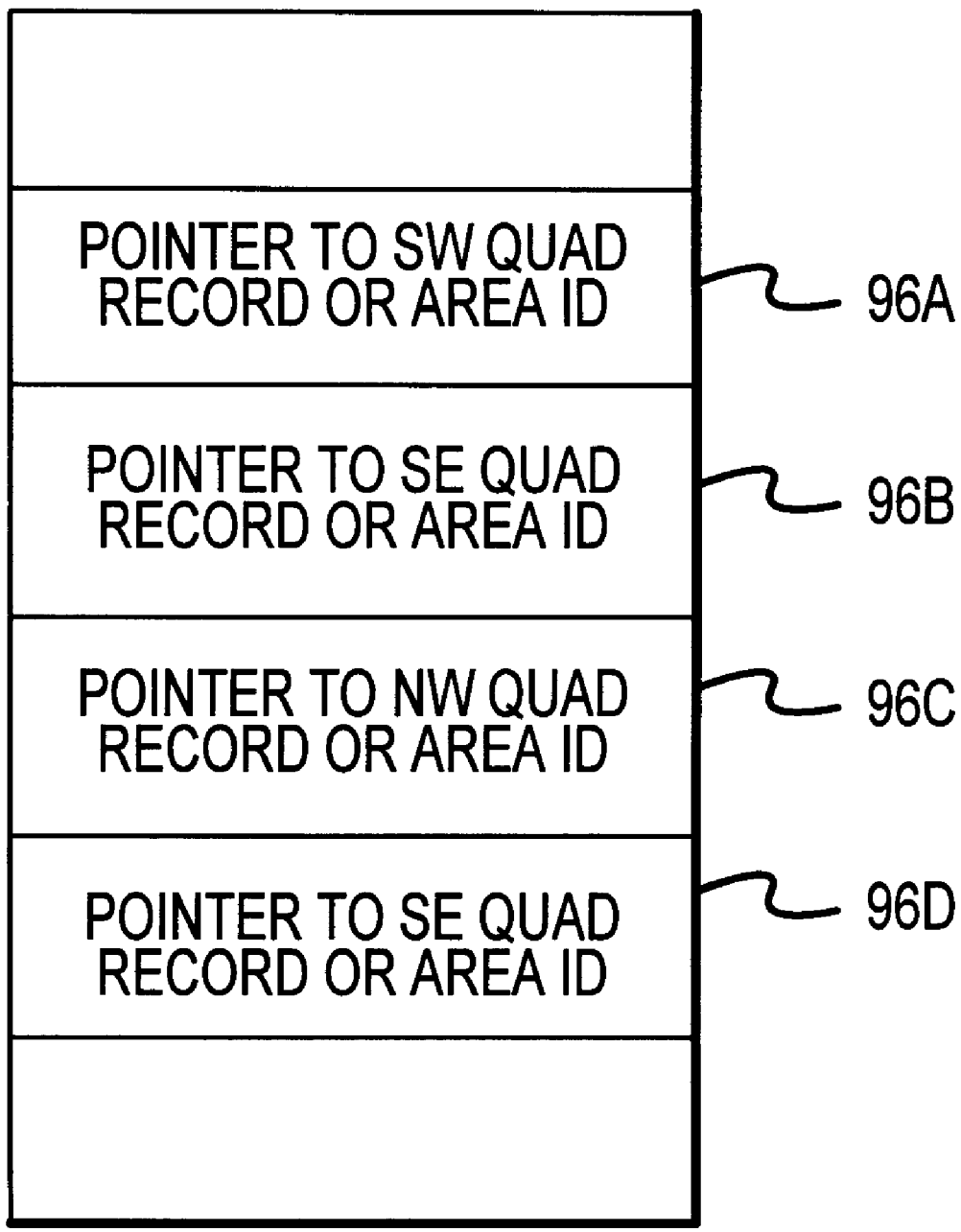
FIG. 9 shows the data structure for one node of a quadtree.

As previously noted the quadtree data structure is implemented in a computer system. With reference to FIG. 9, the contents of the computer implementation of a node 92 that could exist anywhere in the quadtree that is representative of an area of interest are described. The node 92 is a data base record that includes four pointer/area id fields 96A–96D that either contain: (a) pointers to the locations of the data base records for the four sub-nodes representative of the four sub-quadrants of the quadrant that the node represents; (b) an id for the area of interest; or (c) are blank. If the fields 96A–96D are blank, this is an indication that use of the quadtree to determine whether a location is within an area of interest has gone as far as is possible and that the location is not within an area of interest.

The pointers can contain memory addresses if the sub-nodes are all contained in the memory 40. Alternatively, to facilitate caching, the pointers can contain file addresses that are used to locate the node on a the disk drive 44 or some other mass storage device and once located, loaded into the memory 40. The area identifier, if there is only one area of interest, can be a simple flag that indicates that the node is associated with the area of interest. More likely, there will be several areas of interest. For example, there may be a quadtree in which several different areas are identified, where each area is the responsibility of a particular rescue squad. In these situations, the id field contains one of a plurality of possible codes that can be assigned to the multiple areas of interest.

The operation of the computer system 36 in providing an answer as to whether a location associated with a cellular telephone is within an area of interest is now described. As previously mentioned a quadtree that is representative of one or more areas of interest is available for use by the processor 38. For instance, there could be a quadtree data structure that represents areas of responsibility for emergency rescue teams that respond to "911" calls. The quadtree can be entirely located in the memory 40, entirely located on the disk drive 44, or split between the memory 40 and the disk drive 44. Initially, the MSC 30 receives a call request that it recognizes, based upon the destination telephone number, as being a call that requires a determination of whether the location associated with the cellular telephone is within an area of interest. In response, the MSC 30 causes a location associated with the cellular telephone to be provided to the computer system 36. As previously noted, there are a number of different ways that this location can be determined and provided to the computer system 36.

After receipt of the location, the computer system 36 compares the cellular telephone location to the location of the root node of the quadtree, i.e., compares latitudes and longitudes. This comparison serves to identify the sub-node (northeast, southeast, southwest or northwest sub-node) that represents the sub-quadrant that contains the cellular telephone location. For instance, with the location of the center of the root node is at 0 latitude, 0 longitude, and the cellular telephone location is at −5 latitude, −5 longitude, the program determines that the cellular telephone is located in the southwest sub-quadrant of the quadrant represented by the root level node. Once the sub-quadrant has been identified, the pointer to the appropriate sub-node can be obtained and the location associated with the sub-quadrant calculated. In the example, the pointer for the node associated with the southwest sub-quadrant is set forth in field 96A.

The calculation of the location associated with the sub-quadrant involves both a latitude and longitude calculation. The latitude component of the location associated with a sub-quadrant is calculated using the direction information associated with the pointer and a look-up table that is indexed with the level of the quadtree that is of interest. To continue with the example, the look-up table indicates that the second level latitude is 45° and the "south" aspect of the pointer information indicates that the latitude is −45°. This latitude value is relative to the latitude associated with the root node, i.e. 0° latitude. As such, the latitude for the southwest sub-quadrant is −45°. The determination of longitude uses the same technique. To continue with the example, the longitude associated with the southwest sub-quadrant would be −90°. The direction of "north" and "south" for purposes of a latitude calculation are respectively associated with positive and negative movements. In the case of a longitude calculation, the directions of "east" and "west" are respectively associated with positive and negative movements.

At this stage, the pointer is used to access the sub-node and the comparison is repeated to determine which quadrant of the sub-node contains the location of the wireless station. It should be noted that the location of the sub-quadrant at this level is relative to the location associated with the sub-node. So, continuing with the example, the latitude and longitude calculation would be relative to the −45° latitude and −90° longitude associated with the sub-node. This process continues until a node is reached that has an area id in the pointer fields 96A–96D or the pointer fields 96A–96D are blank, which means that the analysis can go no further because there are no pointers to any sub-nodes. If the node is assigned to an area of interest, the computer system can either identify the area of interest to the MSC 30. In response, the MSC can use the identifier to index a look-up table that provides the appropriate telephone number. For example, the MSC 30 could use the identifier to determine the telephone number for the rescue squad in the area of interest. Alternatively, the look-up function can be done by the computer system 36 or within the signaling control point system 50 and provided to the MSC 30.

Alteration of a quadtree data structure that represents one or more areas of interest involves either: (1) an addition in which a new area of interest is added to the present quadtree representation of one or more areas of interest; (2) a deletion in which an existing area of interest is deleted from a quadtree representation of one or more areas of interest; or (3) a modification in which an existing area of interest is altered but not deleted from the quadtree representation.

The addition of a new area of interest to a quadtree representation of one or more areas of interest generally involves: (1) identifying the additions to the present quadtree representation that reflect the new area of interest; and (2) inserting the changes into the quadtree that is being used in the system that actually determines whether the location associated with a wireless station is within the area of interest. In one embodiment, the identification of the additions involves the use of an off-line computer system that includes a copy of the present quadtree representation of one or more areas of interest. The off-line system modifies the quadtree representation of the present areas of interest to reflect the new area of interest and in so doing keeps a list of the changes that are required to the present quadtree representation. The list of changes is placed in a file that includes: (a) a header that identifies the location in the present quadtree representation at which the changes begin; and (b) a list of the changes, which is hereinafter referred to as a sub-tree. The insertion of the changes into the quadtree representation of the present area of interest that is actually being used to determine whether the location of a wireless station is within an area of interest initially involves transferring the file to the signaling control point intelligent network platform 50. The platform 50 uses the list of changes to build the sub-tree. The platform 50 also locks the node in the present quadtree representation at which the sub-tree will be inserted to prevent any processing of wireless station location information that may involve the portion of the quadtree that is being changed from occurring until after the change is complete. After the node is locked the sub-tree is inserted into the present quadtree representation, thereby updating the quadtree representation to reflect the new area of interest.

The deletion of an existing area of interest from a quadtree representation of one or more areas of interest involves: (1) identifying the deletions to the present quadtree representation; and (2) inserting the changes into the present quadtree representation of the area of interest that is being used in the system which actually determines whether the location associated with a wireless station is within the area of interest. In one embodiment, the identification of the deletions involves the use of an off-line computer system that includes a copy of the quadtree representation of the present area of interest. The off-line system is used to identify all of the nodes that are associated with the existing area of interest in present quadtree representation that is going to be deleted from the quadtree. Again, a list of the changes that are required to the present quadtree representation is constructed. The list of changes is placed in a file that includes: (a) a header that identifies the location in the present quadtree representation at which the changes are to begin; and (b) a list of the changes, which is hereinafter referred to as a sub-tree. The off-line system also performs the previously noted consolidation operation with respect to the new quadtree representation of the new area of interest. This consolidation is also reflected in the file containing the list of changes. The insertion of the changes into the quadtree representation of the present area of interest that is actually being used to determine whether the location of a wireless station is within an area of interest involves the same steps as noted with respect to the addition operation.

A modification to an area of interest in a quadtree representation of one or more areas of interest involves: (1) identifying the additions and/or deletions to an existing area of interest in the present quadtree representation that are needed to reflect the modified area of interest; and (2) inserting the changes into the present quadtree representation that is actually being used in the system that actually determines whether the location associated with a wireless station is within the area of interest. In one embodiment, identification and insertion of deletions is accomplished as described hereinabove. The deletion operation is then followed by the identification and insertion of additions as described hereinabove. Alternatively, a file with a list of deletions followed by a list of insertions is built and then inserted into present quadtree representation to perform the update in a single operation.

The foregoing description of the invention has been presented for purposes of illustration and description. Further, the description is not intended to limit the invention to the form disclosed herein. Consequently, variations and modifications commensurate with the above teachings, and the skill or knowledge in the relevant are within the scope of the present invention. The preferred embodiment described hereinabove is farther intended to explain the best mode known of practicing the invention and to enable other skilled in the art to utilize the invention in various embodiments and with the various modifications required by their particular applications or uses of the invention. It is intended that the appended claims be construed to include alternate embodiments to the extent permitted by the prior art.

What is claimed is:

1. A method for use in determining whether a wireless station in a wireless telecommunication system is located within a predetermined are of interest that is of substantially any shape, the method comprising:

receiving a location associated with a wireless station;

providing a quadtree representation of an area that includes a predetermined area of interest, wherein said guadtree representation includes:

level-1 through level-n, where n is an integer;

wherein level-1 has at least one level-1 node that represents a level-1 area;

wherein associated with each level-1 node is a level-1 location;

wherein level-x, where 1<x≦n, has a maximum of four level-x nodes for each level-(x−1) node;

wherein each level-x node represent one of the four subsidiary areas of a level(x−1) area associated with one of the level-(x−1) nodes;

wherein associated with each level-x node is a level-x location;

wherein associated with each level-n node is an indicator of whether or not the level-n area represented by the level-n node is part of the predetermined area of interest; and using said location associated with a wireless station and said quadtree representation to determine whether the wireless station is located within the predetermined area of interest.

2. A method, as claimed in claim 1, wherein said step of using includes:

setting x equal to 1;

first identifying the level-1 node that represents the level-1 area that includes the location associated with the wireless station as the relevant level-x node;

comparing said location associated with a wireless station to a level-x location associated with the relevant level-x node, where 1≦x<n, to determine which level-(x+1) node represents the level-(x+1) area that includes the location associated with the wireless station;

second identifying the level-(x+1) node determined to represent the level-(x+1) area that includes the location associated with the wireless station as the relevant level-x node;

incrementing, following said step of comparing, the value of x by 1;

repeating, if x<n, said steps of comparing, second identifying and incrementing;

transmitting, if x=n, the indicator associated with the level-n node that indicates whether or not the location of the wireless stations is within the predetermined area of interest.

3. A method, as claimed in claim 2, wherein said step of comparing includes:

determining whether the latitude of said location associated with a wireless station is greater than or less than the latitude associated with said level-x location;

determining whether the longitude of said location associated with a wireless station is greater than or less than the longitude associated with said level-x location.

4. A method, as claimed in claim 1, wherein said step of providing a quadtree includes;

storing a level of said quadtree on a disk drive.

5. A method for constructing a quadtree representation of an area that includes an area of interest and is suitable for use in high-speed, wireless telecommunication application that requires a determination of whether a location associated with a wireless station is within the area of interest, the method comprising:

receiving a map of an area of interest in a telecommunication application;

vectorizing the boundaries of the area of interest to define a polygon defined by a plurality of edges that enclose an area;

establishing a quadtree level depth n, where n is an integer;

setting x equal to 1;

identifying a level-1 node that represents a level-1 area that includes the polygon;

defining, if an edge of said polygon is located within a level-(x+1) area that is one of four subsidiary areas of said level-x area, as a level-(x+1) node;

incrementing the value of x by 1;

repeating, if x<n, said steps of defining and incrementing;

establishing, if x=n, an indicator for each level-n node that identifies the polygon;

wherein said identifier can subsequently be used to determine if the location associated with a wireless station is within said polygon.

6. A method, as claimed in claim 5, wherein said step of establishing includes:

determining if four nodes at level-n that represent the four subsidiary areas of a level-(n−1) area have the indicator;

establishing, if all four nodes at level-n have the indicator, the indicator in the level-(n−1) node that has the level-(n−1) area that includes the four subsidiary areas associated with the four nodes at level n; and removing, if all four nodes at level-n have the indicator, the four nodes at level-n from the quadtree.

7. A method, as claimed in claim 6, wherein said step of establishing includes:

repeating said steps of determining, removing and establishing for all the groups of four nodes at level-n that represent four subsidiary areas of a level-(n−1) area that have the indicator.

8. A method, as claimed in claim 7, wherein said step of establishing includes:

repeating said step of determining, removing and establishing for each level.

9. A method, as claimed in claim 5, wherein said step of establishing includes:

setting x equal to n;

determining for all groups of four nodes at level-x that represent the four subsidiary areas of a level-(x−1) area if all four nodes of a group have the indicator;

establishing, for all groups of four nodes have the indicator, the indicator in the level-(x−1) node that has the level-(x−1) area that includes the four subsidiary areas associated with the four nodes at level x;

removing, for all groups of four nodes that have the indicator, the four nodes in each group from the quadtree; and decrementing x by 1;

repeating, if x≧1, said steps of determining, removing and establishing.

10. A method, as claimed in claim 5, further comprising:

inserting a second node to replace an existing, first node;

wherein said second node has either removed or inserted an indicator relative to the existing first, node;

removing, following said step of inserting, said existing, first node.

11. A method for use in determining whether a wireless station in a wireless telecommunication system is located within a predetermined area of interest that is of substantially any shape, the method comprising:

receiving a location associated with a wireless station;

providing a quadtree representation of an area that includes a predetermined area of interest wherein said quadtree representation includes:

level-1 through level-n, where n is an integer;

wherein level-1 has at least one level-1 node that represents a level-1 area;

wherein associated with each level-1 node is a level-1 location;

wherein level-x, where $1<x\leq n$, has a number of level-x nodes that is a multiple of four, where the multiplier is a value from 0 to the number of level-(x−1) nodes;

wherein each level-x node represents one of the four subsidiary areas of a level-(x−1) area associated with one of the level-(x−1) nodes;

wherein associated with each level-x node is a level-x location;

wherein associated with each level-n node is an indicator of whether or not the level-n area represented by the level-n node is part of the predetermined area of interest; and using said location associated with a wireless station and said quadtree representation to determine whether the wireless station is located within the predetermined area of interest.

12. A method, as claimed in claim 11, wherein said step of using includes:

setting x equal to 1;

first identifying the level-1 node that represents the level-1 area that includes the location associated with the wireless station as the relevant level-x node;

comparing said location associated with a wireless station to a level-x location associated with the relevant level-x node, where $1\leq x<n$, to determine which level-(x+1) node represents the level-(x+1) area that includes the location associated with the wireless station;

second identifying the level-(x+1) node determined to represent the level-(x+1) area that includes the location associated with the wireless station as the relevant level-x node;

incrementing, following said step of comparing, the value of x by 1;

repeating, if x<n, said steps of comparing, second identifying and incrementing;

transmitting, if x=n, the indicator associated with the level-n node that indicates whether or note the location of the wireless stations is within the predetermined area of interest.

13. A method, as claimed in claim 12, wherein said step of comparing includes;

determining whether the latitude of said location associated with a wireless station is greater than or less than the latitude associated with said level-x location;

determining whether the longitude of said location associated with a wireless station is greater than or less than the longitude associated with said level-x location.

14. A method for use in determining whether a wireless station in a wireless telecommunication system is located within a predetermined area of interest that is of substantially any shape, the method comprising:

receiving a location associated with a wireless station;

providing a quadtree representation of an area that includes a predetermined area of interest; and using said location associated with a wireless station and said quadtree representation to make a determination as to whether the wireless station is located within the predetermined area of interest;

said method further comprising the steps of;

establishing a definition of said area of interest in terms of area elements of said quadtree data structure and storing said first definition for use by a platform of said wireless telecommunication system for making said determination;

receiving a modification regarding said area of interest said modification affecting an affected portion less than the whole of said definition of said area of interest;

establishing modification information reflecting said modification affecting said affected portion of said definition of said area of interest;

storing said modification information for use by said platform of said wireless telecommunication system for making said determination; and after said step of storing said modification information, deleting information related to said affected portion from said definition of said area of interest;

wherein said definition of said area of interest is modified with little effect on said wireless telecommunication system.

* * * * *